US008225348B2

(12) United States Patent
Morris et al.

(10) Patent No.: US 8,225,348 B2
(45) Date of Patent: Jul. 17, 2012

(54) MODERATED INTERACTIVE MEDIA SESSIONS

(75) Inventors: Scott Morris, Decatur, GA (US); Dale Malik, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 528 days.

(21) Appl. No.: 12/209,392

(22) Filed: Sep. 12, 2008

(65) Prior Publication Data

US 2010/0070999 A1  Mar. 18, 2010

(51) Int. Cl.
*G06F 3/00* (2006.01)
(52) U.S. Cl. .......................................... 725/37; 725/47
(58) Field of Classification Search .................. None
See application file for complete search history.

(56) References Cited

U.S. PATENT DOCUMENTS

| 7,386,799 B1* | 6/2008 | Clanton et al. ................ 715/758 |
| 2003/0158957 A1 | 8/2003 | Abdolsalehi |
| 2004/0019912 A1* | 1/2004 | Staack ........................ 725/109 |
| 2004/0032486 A1* | 2/2004 | Shusman ................... 348/14.09 |
| 2004/0139472 A1* | 7/2004 | Furet et al. ..................... 725/109 |
| 2004/0166798 A1 | 8/2004 | Shusman |
| 2006/0252547 A1* | 11/2006 | Mizrahi et al. .................. 463/42 |
| 2007/0288978 A1 | 12/2007 | Pizzurro et al. |
| 2008/0059986 A1* | 3/2008 | Kalinowski et al. .............. 725/1 |
| 2008/0275769 A1* | 11/2008 | Shao ............................... 705/14 |
| 2009/0063991 A1* | 3/2009 | Baron et al. .................. 715/751 |
| 2009/0271821 A1* | 10/2009 | Zalewski ........................ 725/37 |
| 2010/0145801 A1* | 6/2010 | Chekuri .................... 705/14.51 |

OTHER PUBLICATIONS

Chekuri—U.S. Appl. No. 60/984,710, filed Nov. 1, 2007.*

* cited by examiner

*Primary Examiner* — Hai V Tran
*Assistant Examiner* — Junior Mendoza
(74) *Attorney, Agent, or Firm* — Toler Law Group, PC

(57) ABSTRACT

Systems and methods to provide interactive moderated collaborative sessions are disclosed. In a particular embodiment, a method is disclosed that includes receiving a media stream and associating moderator controls with the media stream to create an interactive media session. The interactive media session enables multiple remote users to interact with one another with respect to the media stream. The moderator controls enable a moderator to facilitate the interaction of the multiple remote users. The method also includes sending display data to display devices of the multiple remote users. The display data is based on moderator control input received via the moderator controls, interactive input received from the multiple remote users, and the received media stream.

24 Claims, 9 Drawing Sheets

MODERATED INTERACTIVE MEDIA SESSIONS

FIELD OF THE DISCLOSURE

The present disclosure is generally related to moderated interactive media sessions.

BACKGROUND

Television has historically been primarily a one-way communication medium. Content providers have traditionally broadcast media to a plurality of users via satellite, cable or airway broadcasts. More recently, content providers have also provided content via interactive television signals over packet switched networks. However, even interactive systems often function as one-way communication mechanisms to distribute media content to users. Thus, interactions between viewers of the media content are often isolated and separate from generation of the media content.

DETAILED DESCRIPTION OF THE DRAWINGS

Systems and methods to provide interactive moderated collaborative sessions are disclosed. In a particular embodiment, a method is disclosed that includes receiving a media stream from a content provider and associating moderator controls with the media stream to create an interactive media session. The interactive media session enables multiple remote users to interact with one another with respect to the media stream. The moderator controls enable a moderator to facilitate the interaction of the multiple remote users in real-time. The method also includes sending display data to display devices of the multiple remote users. The display data is based on moderator control input received via the moderator controls, interactive input received from the multiple remote users, and the received media stream.

In another embodiment, a system is disclosed that includes a content interface to receive a media stream including media content and includes an interactive media system to receive interaction input from multiple remote users so that the users may interact with one another with respect to the media stream. The system includes a moderator control system to provide a moderator controls. The moderator controls enable a moderator to facilitate the interaction of the multiple remote users. The system further includes a display interface to send display data to a moderator display device. The display data includes the media content and includes interaction input received from one or more of the multiple remote users. The display data also includes data for display of a moderator control panel. The moderator control panel includes selectable elements associated with the moderator controls.

In another embodiment, a computer-readable medium is disclosed that includes instructions that, when executed by a processor, cause the processor to associate a set of moderator controls with a media stream and to receive a media stream from a content provider to create an interactive media session. The interactive media session enables multiple remote users to interact with one another with respect to the media stream. The set of moderator controls enable a moderator to facilitate the interaction of the multiple remote users in real-time. The computer-readable medium also includes instructions that, when executed by the processor, cause the processor to send display data to display devices of the multiple remote users. The display data is based on moderator control input received via the moderator controls, interactive input received from the multiple remote users, and the display data is based on the received media stream.

Figure 1:
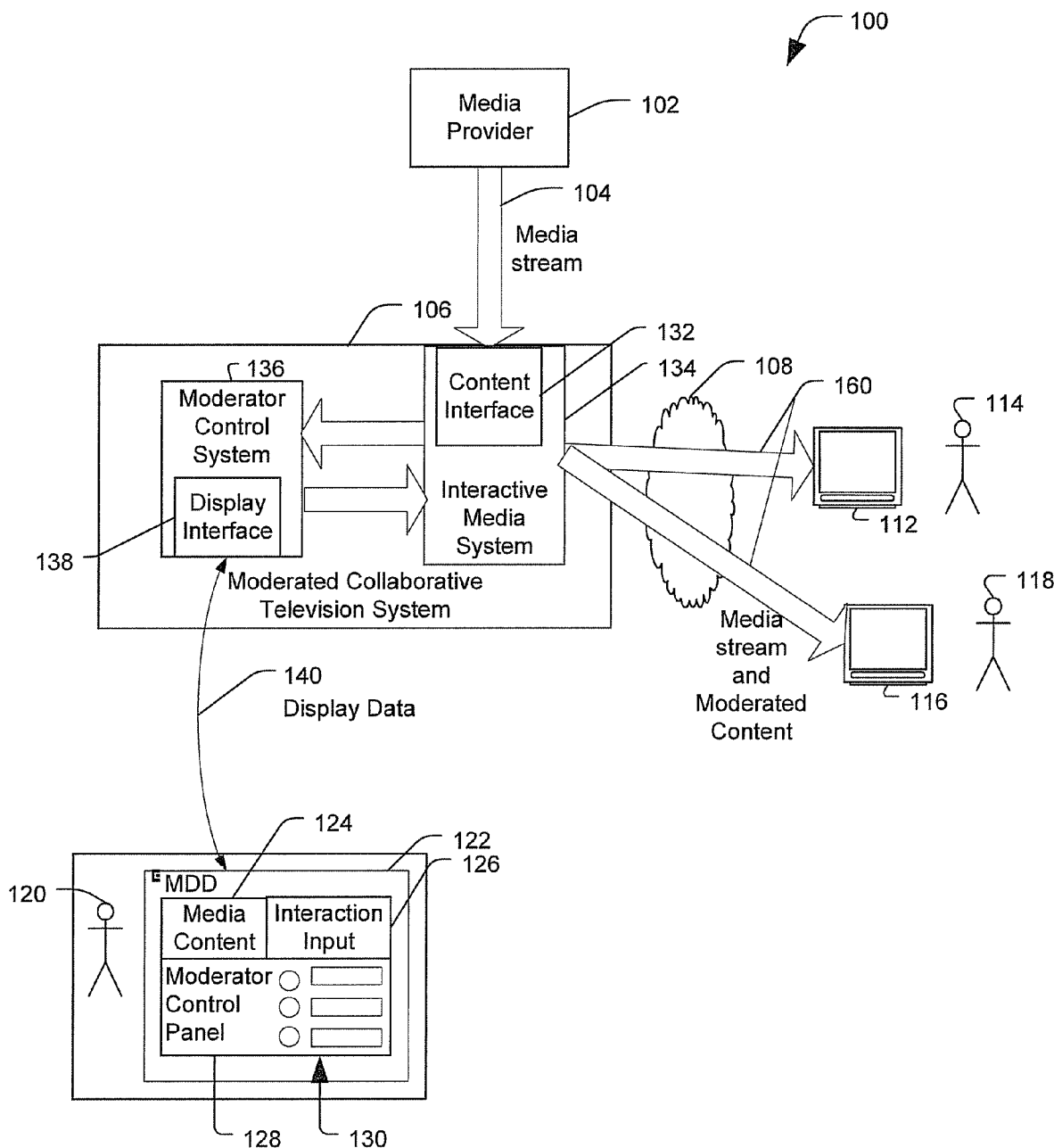
FIG. 1 depicts a block diagram of a first illustrative embodiment of a system to provide moderated collaborative sessions.

Referring to FIG. 1, an illustrative embodiment of a system to provide moderated interactive media sessions is depicted and generally designated 100. The system 100 includes a media provider 102 that supplies a media stream 104 to a moderated collaborative television system 106. The moderated collaborative television system 106 includes an interactive media system 134 and a moderator control system 136. The interactive media system 134 provides a media stream and moderated content 160 to a first display device 112 associated with a first remote user 114 and to a second display device 116 associated with a second remote user 118 via a network 108. The network 108 may be a distributed computer network. The moderator control system 136 is configured to provide display data 140 to a moderator display device 122 associated with a moderator 120.

The interactive media system 134 includes a content interface 132 that is configured to receive the media stream 104. The media stream 104 includes media content, such as a television program, a movie, video-on-demand (VOD) content, other steaming video or multimedia content, or any combination thereof. The interactive media system 134 is configured to receive feedback from the remote users 114 and 118 and to provide the feedback from the remote users 114 and 118 to the moderator control system 136. In addition, the interactive media system 134 is configured to receive control data from the moderator control system 136. The control data may be applied to the received media stream 104 to generate the media stream and moderated content stream 160 that is supplied to the remote users 114 and 118.

In a particular embodiment, the moderator control system 136 is configured to receive the media stream 104 from the interactive media system 134 and to also receive data corresponding to interactive comments and actions from the remote users 114 and 118 from the interactive media system 134. The moderator control system 136 is configured to provide a set of moderator controls to enable the moderator 120 to facilitate the interaction of the multiple remote users 114 and 118. The moderator control system 136 includes a display interface 138 to send the display data 140 to the moderator display device 122. The display data 140 includes the media content of the media stream 104 and includes interaction input received from one or more of the multiple remote users 114 and 118. The display data 140 also includes a moderator control panel 128 that includes selectable elements associated with the moderator controls. The moderator control system 136 is configured to receive information from the moderator 120, such as control data selected via the moderator control panel 128, and to provide the data associated with the moderator controls and associated data to the interactive media system 134.

The moderator display device 122 may be configured to enable the moderator 120 to manage a collaborative interactive viewing session for the multiple remote users 114 and 118. The moderator display device 122 may display media content 124 on which the collaborative session is focused which may be provided via the media stream 104. The moderator display device 122 may also include an interaction input display portion 126 that displays interaction input that is received from the one or more remote users 114 and 118. The moderator display device 122 may further include the moderator control panel 128 to provide controls and other mechanisms to enable the moderator 120 to manage and moderate the collaborative session associated with the media content 124. As illustrated, the moderator control panel 128 includes selectable elements 130 associated with the moderator controls.

By enabling multiple remote users, such as the remote user 114 and 118, to receive the media stream with moderated content 160 and to provide feedback to the moderated collaborative television system 106, and further enabling a moderator 120 to monitor and receive the user feedback and to control a collaborative session associated with the media stream 104, the moderated collaborative television system 106 enhances a viewing experience of the remote users 114 and 118. In addition, because the moderated collaborative session is focused on the media stream 104 which is provided by the media provider 102, the system 100 enables a group of remote users and a selected moderator to engage in collaborative participation without requiring any of the users or the moderator to generate primary media content. For example, the media content provided by the media stream 104 may include a live television broadcast of a sporting event, such as a football game. The remote users 114 and 118 and other remote users may agree to engage in a moderated collaborative session to enjoy an enhanced viewing session of the football game. The users 114, 118, and other users (not shown) may select the moderator 120 or may elect to join a group already in progress using the moderator 120 to enhance their viewing and interactive experience.

Figure 2:
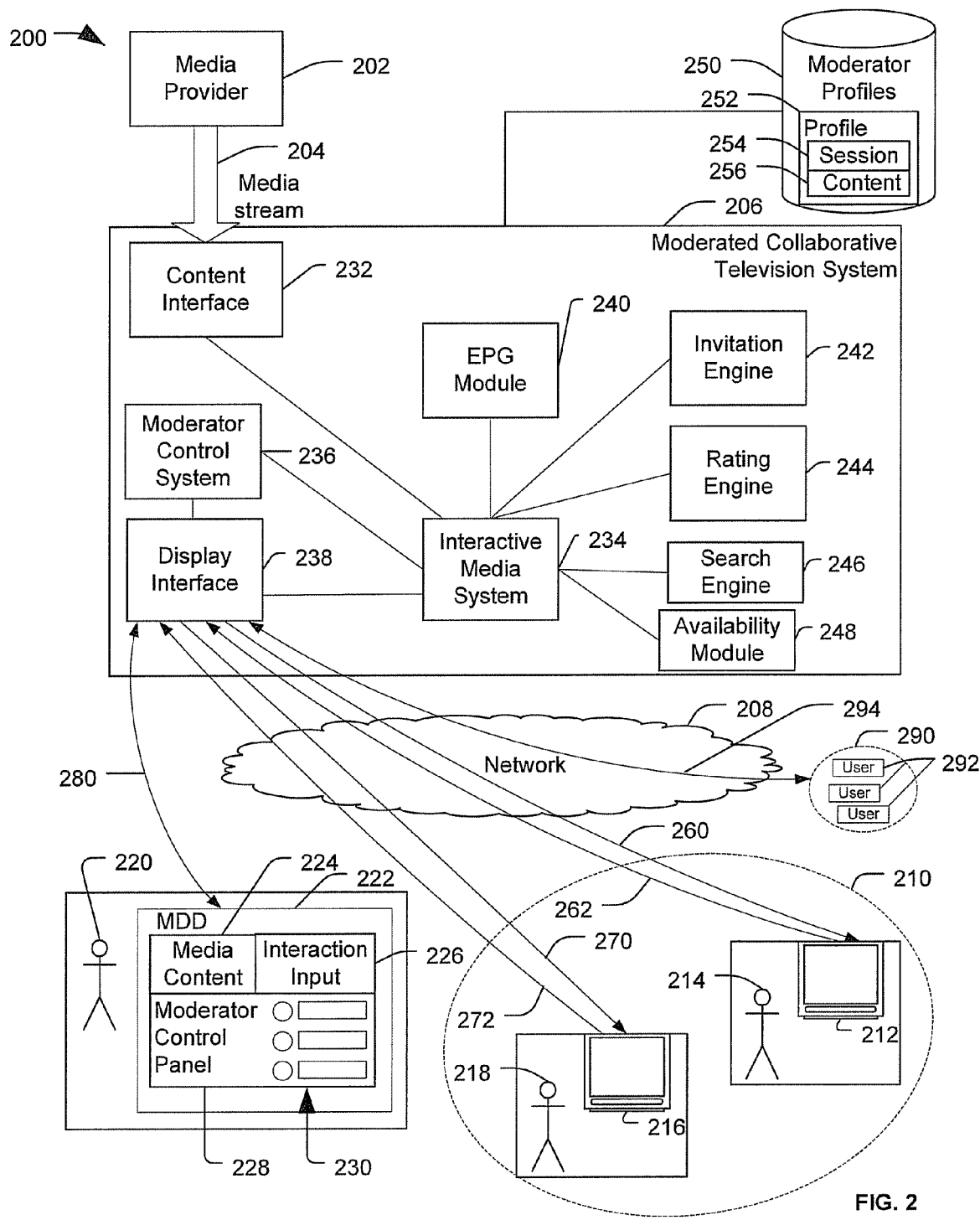
FIG. 2 depicts a block diagram of a second illustrative embodiment of a system to provide moderated collaborative sessions.

Referring to FIG. 2, a particular illustrative embodiment of a system to provide moderated collaborative interactive sessions is depicted and generally designated 200. The system 200 includes a media provider 202 that provides media content via a media stream 204 to a moderated collaborative television system 206. The moderated collaborative television system 206 includes a content interface 232 coupled to an interactive media system 234. The interactive media system 234 is coupled to a moderator control system 236 and to a display interface 238 that is in communication with a first group of users 210 and a second group of users 290 via a network 208. In addition, the display interface 238 is in communication with a moderator display device 222 of a moderator 220 via the network 208. Moderator profiles 250 are accessible to the moderated collaborative television system 206. The moderator profiles 250 include a representative moderator profile 252 that includes stored session data 254 and stored session content 256. The moderated collaborative television system 206 further includes an electronic program guide (EPG) module 240, an invitation engine 242, a rating engine 244, a search engine 246, and an availability module 248. In a particular embodiment, the moderated collaborative television system 206 may be the moderated collaborative television system 106 of FIG. 1.

In a particular embodiment, the media provider 202 may include one or more providers, such as television content providers, Internet Protocol content providers, satellite content providers, cable television content providers, or any combination thereof. In addition, the media provider 202 may include one or more video-on-demand content providers. The media provider 202 may provide media content via the media stream 204 to the moderated collaborative television system 206. For example, the media content of the media stream 204 may include television programs, movies, streaming Internet media content, video-on-demand, audio, or any combination thereof.

In a particular embodiment, the content interface 232 is configured to receive the media stream 204 and to provide the media stream 204 to the interactive media system 234. For example, the content interface 232 may include one or more network interfaces, decoders, encoders, encryption and decryption devices, other network elements, or any combination thereof.

In a particular embodiment, the interactive media system 234 is configured to receive media content from the content interface 232. The interactive media system 234 is also configured to receive interaction input from multiple remote users to interact with one another with respect to the media stream 204. As illustrated, the interactive media system 234 is configured to provide display data 260 to the first display device 212 associated with a first remote user 214 within the first group of remote users 210. The interactive media system 234 also provides display data 270 to a second display device 216 associated with a second remote user 218 of the first group of remote users 210. The interactive media system 234 receives first interaction data 262 of the first remote user 214, such as via the first display device 212. The interactive media system 234 also receives second interaction data 272 from the second remote user 218 via the second display device 216. The first display data 260 provided to the first remote user 214 and the second display data 270 provided to the second user 218 may each include media content provided by the media stream 204 as modified by the moderator 220. In addition, the display data 260 and 270 may also include interactive content that may be provided by one or more users of the first group of remote users 210, as selected, edited, filtered, and otherwise controlled by the moderator 220.

In a particular embodiment, the moderator control system 236 is configured to provide a set of moderator controls, such as the controls of the moderator control panel 228 at the moderator display device 222. The moderator controls enable the moderator 220 to facilitate the interaction of the multiple remote users 214 and 218. The moderator control system 236 may communicate with the moderator 220 via the display interface 238.

In a particular embodiment, the display interface 238 is configured to send the display data 280 to the moderator display 222. The display data 280 may include media content received from the media provider 202 and may also include interaction input received from one or more of the multiple remote users 214 and 218. The display data 280 may also include data display a moderator control panel 228. The moderator control panel 228 includes selectable elements 230 associated with the moderator controls. In addition, the display interface 238 may be configured to provide interaction input 226 to display at the moderator display device 222 via the display data 280. The interaction input 226 may include interactive data that was received from the multiple remote users, such as the first interaction data 262 from the first remote users 214, and the second interaction data 272 received from the second remote user 218. The display interface 238 may also be configured to send and receive data via the network 208 to remote users, such as the remote users 214 and 218.

The EPG module 240 may be configured to generate electronic program guide display data corresponding to one or more programs or other available multimedia content. For example, the EPG module 240 is operable to enable the remote users 214, 218 to browse and select a particular media program or moderated collaborative session to join. For example, the EPG module 240 may provide EPG display data that includes one or more moderator profiles, such as the representative moderator profile 252. As will be discussed with respect to FIG. 7, the EPG module 240 may provide users with an interface to view stored interactive session content 254, interactive media content 256, or any combination thereof, when selecting a moderated collaborative session to join via the EPG module 240.

In a particular embodiment, the invitation engine 242 is configured to send interaction invitations to users of the interactive media system 234, such as the first remote user 214 and the second remote user 218. The interaction invitations may invite the users 214 and 218 to interact with remote users with respect to the media stream 204. For example, when multiple remote users, such as the representative remote users 214 and 218 of the first group of remote users 210, decide to engage in a moderated collaborative session, one or more of the multiple remote users 214 and 218 of the first group of remote users 210 may instruct the invitation engine 242 to send invitations to one or more other users of the interactive media system 234, such as via a selection at a control panel of a display device, such as the first display device 212. The invitation engine 242 may be configured to receive an instruction from the interactive media system 234 indicating a request from a remote user to send invitations to one or more other users to join the collaborative session. For example, the invitation engine 242 may send a request to all participating users of the interactive media system 234, all users associated with one or more user profiles that indicate an affinity to the particular media content selected for the moderated collaborative session, one or more users specified in the request, one or more users having a history of participating in groups with the requesting user, such as in groups with the first remote user 214, or any combination thereof.

In a particular embodiment, the rating engine 244 is configured to receive input rating one or more of the remote users 214 and 218. For example, as will be discussed with respect to FIG. 6, the moderator 220 may be able to rate one or more users participating in the moderated collaborative session for quality of comments, quantity of comments, or other criteria that the moderator 220 determines will be useful, exciting, or otherwise beneficial to share in the moderated collaborative session. For example, the moderator 220 may determine to share the comments of one or more of the multiple remote users 214, 218 with the rest of the first group of remote users 210. The moderator 220 may select one or more of the first group of users 210 based on the user rating, as determined by the rating engine 244, to generate a "front row" of users whose comments are provided to all of the first group of users 210 along with the content of the media stream 204, as will be discussed with respect to FIG. 5.

In a particular embodiment, the search engine 246 is configured to facilitate selection of a moderator, such as the moderator 220. The search engine 246 may be adapted to access moderator profiles 250 that are associated with one or more moderators and to send the moderator profiles, such as the representative profile 252, to one or more of the multiple remote users 214 and 218. Thus, the search engine 246 enables the remote users 214 and 218 to search for a moderator to engage in the moderated collaborative session. The search engine 246 may enable one or more of the remote users 214 and 218 to view saved portions of interactive media sessions 254 that were facilitated by the moderator. The search engine 246 may further enable the remote users 214, 218 to view user comments associated with the saved portions of the interactive media sessions 254 and portions of media content 256 associated with the saved portions of the interactive media sessions. By enabling the remote users 214 and 218 to search for and examine content of previous moderated sessions, the search engine 246 enables the remote users 214 and 218 to search for a moderator suitable for a session with the first group of users 210.

In a particular embodiment, the rating engine 244 is further configured to receive input rating a moderator, such as the moderator 220. For example, the rating engine 244 may receive data from the interactive media system 234 corresponding to a rating of the moderator 220 made by one or more of the remote users 214 and 218. The rating engine 244 may be configured to store an update of the moderator rating to the representative profiles 252 associated with the moderator 220.

The interactive media system 234 may be any type of media system that enables content to be provided to multiple remote users and that enables interaction data to be received from the multiple remote users. For example, the interactive media system 234 may be an Internet Protocol Television (IPTV) system, a cable providing system, a satellite system with a back channel, or any other system enabling two-way communication with remote users, or any combination thereof.

In a particular embodiment, the availability module 248 is configured to provide presence information with respect to one or more users, such as the remote users 214 and 218. The presence information may indicate whether the one or more users 214 and 218 are available for interaction. The availability module 248 may further be configured to provide availability information with respect to one or more moderators, such as the moderator 220. The availability information with respect to the one or more moderators may indicate whether the one or more moderators are available to moderate an interactive media session. For example, the availability module 248 may provide data to the interactive media system 234 which may be sent to the one or more remote users 214 or 218 to indicate to the remote users 214 or 218 the availability of other users or moderators that may be contacted to join a group, such as via the invitation engine 242.

Though the content interface 232, moderator control system 236, display interface 238, the EPG module 240, the invitation engine 242, the rating engine 244, the search engine 246, and the availability module 248 are depicted in communication with the interactive media system 234 within the moderated collaborative television system 206, in other embodiments one or more of the system elements 232-248 may be modules that are executed by a processor, such as at a collaborative moderated session server. In another embodiment, one or more of the moderated collaborative television system 206 elements 232-248 may be independent elements coupled via one or more network connections to other elements of the moderated collaborative television system 206.

The moderator display device 222 may enable the moderator 220 to view media content 224 at a media content window, to view interaction input 226 at an interaction input area, and to control and moderate the moderated collaborative session via the moderator control panel 228 including one or more selectable elements 230. The moderator display device may receive the display data 280 enabling the moderator 220 to observe the media content 224 and receive interaction input 226 from all of the first group of users 210 and to actively moderate and control the session by making selections and adding content via the moderator control panel 228. The moderator display device 222 may further be configured to send control data to the moderator control system 236, which may be applied to the media content of the media stream 204 and provided to the individual users of the first group of users 210 via the display data 260 and 270. In addition, where the moderator 220 is engaged in moderating multiple sessions, portions of the moderated data, including media content and other collaborative content may be provided by display data 294 to the second group of users 290 including multiple remote users 292. The second group of users 290 may engage in an independent collaborative moderated session from the first group of users 210, which may be moderated by the moderator 220 concurrently with moderation of the first group of users 210, or by another moderator (not shown).

During operation, a remote user, such as the remote user 214, may send a request to the interactive media system 234 to initiate a moderated collaborative session. The remote user 214 may query and receive a list of available remote users, such as the second remote user 218, via the availability module 248. Upon finding one or more users that the first remote user 214 would like to have join in a moderated collaborative session, the first user 214 may send a request to the determined group of remote users via the invitation engine 242. The invitation engine 242 may generate and send invitations to selected users, including the second remote user 218 and other users (not shown) of the first group of remote users 210. Recipients of the invitations may accept the invitation and those recipients may be organized via the interactive media system 234 as the first group of remote users 210.

One or more of the first group of remote users 210, such as the first remote user 214, may further determine a moderator to moderate the collaborative session. The first remote user 214 may query and receive a search result from the search engine 246 indicating one or more moderators including a profile and examples of stored media sessions and interactive content from the stored media sessions. In particular, the first remote user 214 may send a request for a search of moderators based on one or more criteria. The request may be received via the interactive media system 234 and provided to the search engine 246. In response to the request, the search engine 246 may conduct a search of the moderator profiles 250 and return data corresponding to one or more of the moderator profiles 250, such as the representative profile 252 associated with the moderator 220.

The search return data may be provided to the interactive media system 234 which may distribute the data to the first remote user 214, or alternatively to the entire group of remote users 210 that are engaged in the collaborative session. A determination may be made by one or more of the first group of remote users 210 as to which moderator would be preferable to moderate the session, and an availability of the moderator may be determined by the availability module 248. Upon determining an available moderator, such as the moderator 220, a request may be sent via the invitation engine 242 to the moderator 220, who may accept or decline the request via the moderator display device 222.

When the moderator 220 accepts the request, the moderator 220 may initiate moderator controls via the moderator control panel 228 to establish automatic actions that may be performed in response to specified conditions during the interactive media session. For example, the moderator control panel 228 may enable the moderator 220 to display pre-recorded content, such as a football fight song, when a touchdown is detected in the media content. As another example, the moderator control panel 228 may enable the moderator 220 to automatically provide content to the first group of users 210 based on a mood or tone of the media content or a setting of the media content. For example, when scary music is played or a laugh track is played in the media content, automatic actions may be performed to generate additional content that is provided to the first group of users 210 along with the media stream. In another example, where the first group of users 210 use avatars to represent their respective participation, and where the avatars are displayed at the display devices 212 and 216 overlaid or in connection with the media content, actions of the user avatars may be triggered based on automatic moderator controls. For example, when a "scary" scene occurs in the media content, the user avatars may be configured to begin shaking automatically. In another example, when an exciting part of the media content is detected, such as a football touchdown, user avatars may be configured to jump up and down excitedly on the user screens.

Control data corresponding to moderator controls and other content provided by the moderator 220 may be received at the moderator control system 236 and incorporated into the media stream at the interactive media system 234 for distribution to the first group of users 210. The first group of users 210 may provide interactive input to the collaborative session, such as the first interaction data 262 and the second interaction data 272. The first and second interaction data 262 and 272 may be provided to the moderator display device 222, and the moderator 220 may selectively determine whether to distribute the interaction data 262 or 272 to the entire first group of users 210, or to not display the interaction data 262 or 272 to the first group of users 210. In addition, the moderator 220 may monitor the interaction data 262 and 272 that is received and displayed at the interaction input 226 on the moderator display device 222. The moderator 220 may create or modify a rating of one or more of the users of the first group of users 210, which may be tracked and stored by the rating engine 244. The moderator 220 may also determine a sub-set of the first group of users 210 as a designated "front row" of users whose comments may be automatically provided to the first group of users 210 without prior filtering by the moderator 220.

For example, the moderator 220 may determine that the second remote user 218 writes appropriate and entertaining interaction data 272 and may designate the second remote user 218 as a "front row" participant. The avatar of the second user 218 may be provided to the display devices of all of the first group of users 210 and comments or other content provided by the second remote user 218 may be automatically displayed to all of the first group of users 210.

As the moderator collaborative session continues, or comes to an end, users of the first group of the remote users 210 may rate the moderator 220 based on one or more rating criteria, such as entertainment, knowledge, authority, appropriateness of moderation, or other factors. The one or more users may send rating data via the interaction data 262 or 272, which may be received at the rating engine 244 and provided to the moderator profiles 250 as an update to the moderator rating. Thus, a fully collaborative session may be generated and user driven, where the users may select a participating group of users, may select a moderator, and may participate in a moderated collaboration based on media provided by the media provider 202, and not solely based on content generated by the moderator 220 or the group of users 210.

Figure 3:
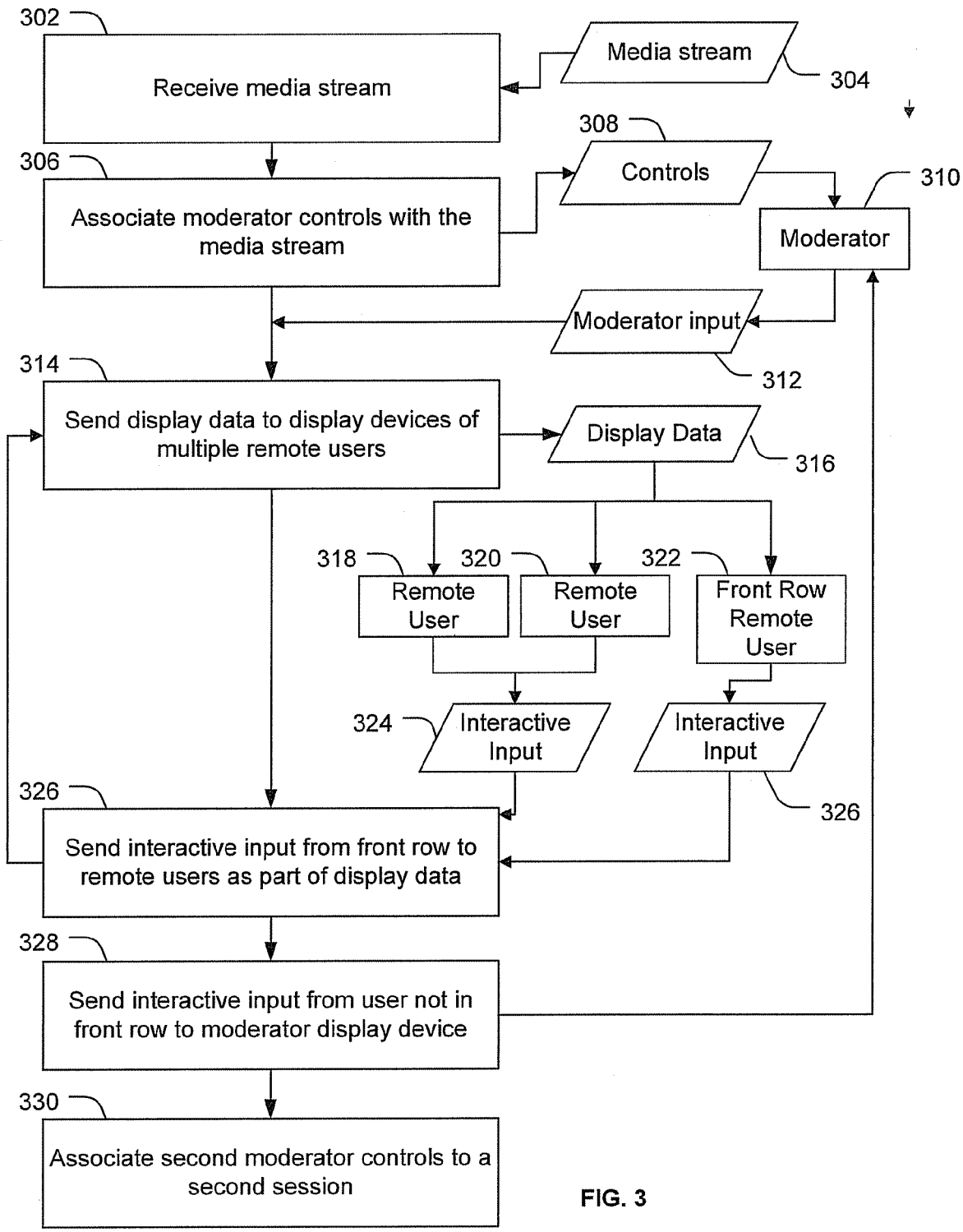
FIG. 3 depicts a flowchart of a first illustrative embodiment of a method to provide a moderated collaborative session.

Referring to FIG. 3, a method is depicted that includes receiving a media stream 304 from a content provider, at 302. Advancing to 306, moderator controls 308 are associated with the media stream to create an interactive media session. The interactive media session enables multiple remote users to interact with one another with respect to the media stream, and the moderator controls enable a moderator 310 to facilitate the interaction of the multiple remote users, such as via the moderator input 312, and in real-time or near real-time.

Moving to 314, display data is sent to display devices of the multiple remote users. The display data 316 is based on the moderator control input 312 received via the moderator controls, interactive input received from the multiple remote users 318, 320, and 322, and based on the received media stream 304.

In a particular embodiment, the moderator controls 308 include filters to inhibit the display of selected types of content and the interactive media session. For example, the moderator controls 308 may include filters to inhibit display of profanity, adult content, other age-appropriate or inappropriate content, or any combination thereof. The moderator controls 308 may also include automatic actions to be performed in response to specified conditions that occur during the interactive media session. For example, when something happens in the media stream 304, such as a touchdown of a football game, a touchdown flag may automatically be inserted into the media stream. Other examples include a setting, mood or tone occurring in the media, such as "scary" music or a laugh track, that automatically set a mood flag into the media. The mood flag or other flags that have been inserted into the media may be used to trigger actions of user avatars.

In a particular embodiment, the moderator controls 308 include an interface to select a "front row" of users from the multiple remote users 318, 320, and 322. Interactive input 326 received from the "front row" of users, such as the "front row" remote user 322, may be included within the display data and sent to remote users, at 326. Advancing to 328, interactive input 324 that is received from a user of the remote multiple users not in the "front row", such as from the remote user 318 or the remote user 320, may not be included in the display data and may instead may be sent to a moderator display device for display to the moderator 310.

In a particular embodiment, each of the multiple users are represented by a user avatar. The display data that is sent to the display devices of the multiple remote users may include user avatars that are associated with each user in the "front row" of users. Other avatars that are not associated with users in the "front row" of users may not be included in the display data that is sent to the multiple remote users.

In a particular embodiment, the moderator controls 308 include an interface to rate one or more users of the multiple remote users based on interactive input received from the one or more users during the media session. For example, the moderator 310 may rate one or more of the remote users 318-322 based on the interactive input 324 and 326 that is received during the media session. The rating determined by the moderator 310 may be used to select participants to join the "front row" during the media session or other media sessions.

In a particular embodiment, the display data is generated based on interactive input received from the multiple remote users and from the received media stream. The display data may include moderator selectable elements associated with the moderator controls that are provided to the moderator 310. For example, first display data may be received by the remote users 318-322 that includes the media content and the moderated content selected by the moderator 310 based on interaction data from the remote users 318-322. Second display data may be generated and provided to the moderator 310. The second display data may include the media content, moderator controls including selectable elements, interactive input received from one or more of the remote users 318-322, other moderator-based content, and any combination thereof.

Advancing to 330, moderator controls associated with a second interactive media session that is communicated concurrently with to the first interactive media session may be provided to the moderator 310. The second moderator controls may enable the moderator to facilitate interaction of second remote users in real-time. The second display data that is provided to the moderator 310 may include second moderator selectable elements associated with the second moderator controls. The moderator controls may also include a provisioning interface to enable distribution of one or more virtual items to one or more of the multiple remote users. For example, the moderator controls may include an interface to enable distribution of one or more avatars, promotional items, other virtual items, or any combination thereof, to one or more of the multiple remote users.

In a particular embodiment, interactive input may be received from at least one of the multiple remote users, such as the interactive input 324 or 326. Interactive input 324 or 326 may be stored in a database with a time stamp indicating the time index of the media stream indicating when the interactive input was received. For example, as will be discussed with respect to FIG. 8, a recording of at least of a portion of the interactive media session may be stored for future playback or retrieval. The stored content may include the media content, user comments, moderator comments, screen shots, text annotations, or other aspects of the interactive media session.

Figure 4:
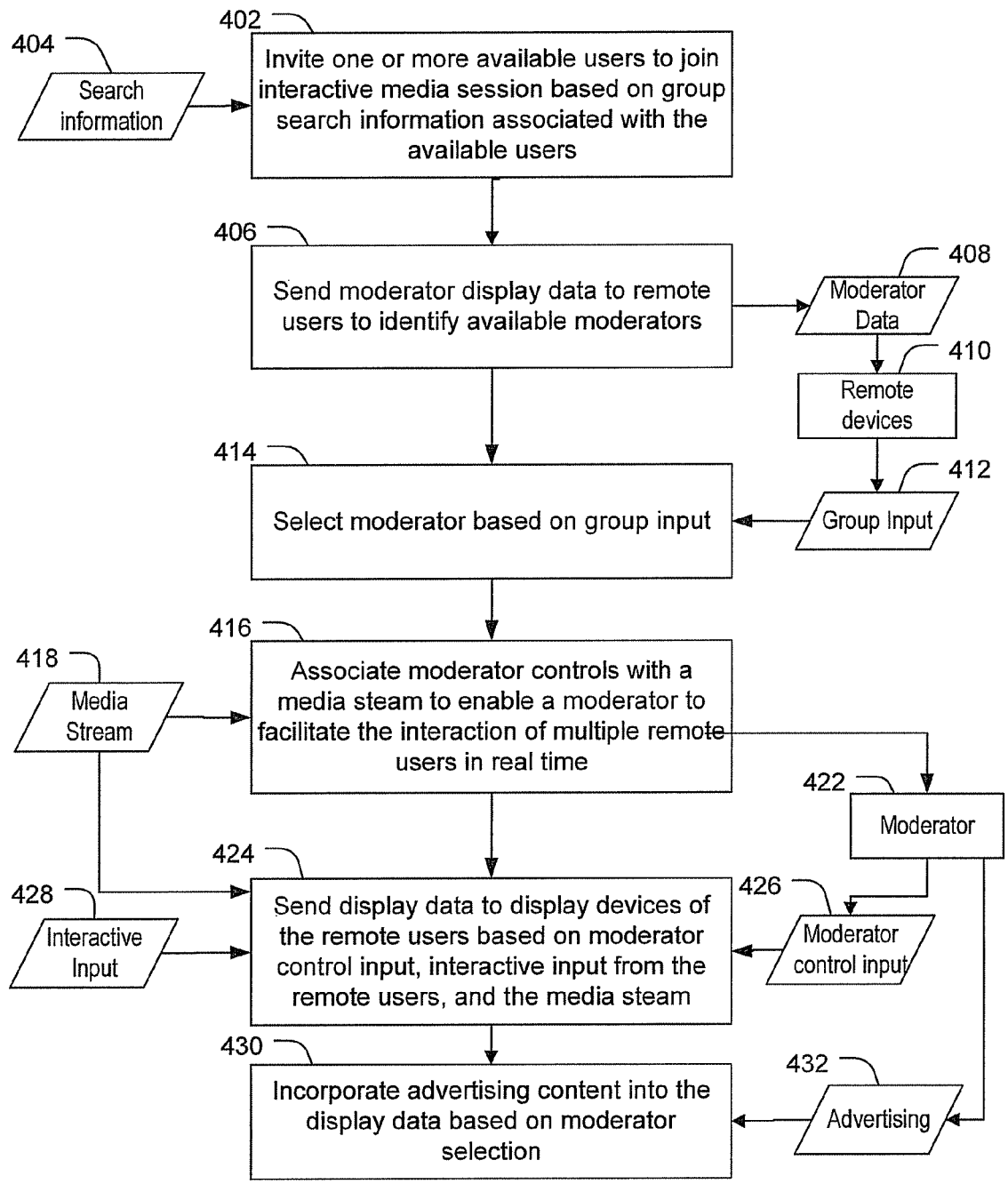
FIG. 4 depicts a flowchart of a second illustrative embodiment of a method to provide a moderated collaborative session.

Referring to FIG. 4, a method is depicted that includes providing one or more available users to join an interactive media session based on group search information 404 associated with one or more available users, at 402. Advancing to 406, moderator display data 408 may be sent to the display devices 410 of one or more of the multiple remote users. The moderator display data may indicate a fee charged by a moderator to moderate the interactive media session. The moderator display data 408 may identify moderators available to moderate the interactive media session. The moderator display data 408 may also indicate whether the one or more users are authorized to participate in the interactive media sessions moderated by a particular moderator.

Continuing to 414, a moderator may be selected based on group input 412 that may be received from the remote devices 410 of the multiple remote users. Proceeding to 416, a set of moderator controls may be associated with a media stream 418 to receive the media stream 418 from a content provider to create an interactive media session. The interactive media session may enable multiple remote users to interact with one another with respect to the media stream 418. The set of moderator controls may enable a moderator 422 to facilitate interaction of the multiple remote users in real-time.

Continuing at 424, display data may be sent to display devices of the multiple remote users. The display data may be based on the moderator control input 426 received via the moderator controls, interactive input 428 received from the multiple remote users, and based on the received media stream 418. Advancing to 430, advertising content 432 may be incorporated into the display data that is provided to the multiple remote users based on the selection of the moderator. For example, one or more moderators may be sponsored, such as by a sporting goods manufacturer for moderators of sporting events, by a provider of goods or services corresponding to particular media content, or as a general sponsorship for a particular moderator. In a particular embodiment, a selected moderator may be compensated by the moderated collaborative television system provider, by the users, by a sponsor of the moderator, or any combination thereof. In another embodiment, the moderator may not receive compensation for performing moderator activities.

Figure 5:
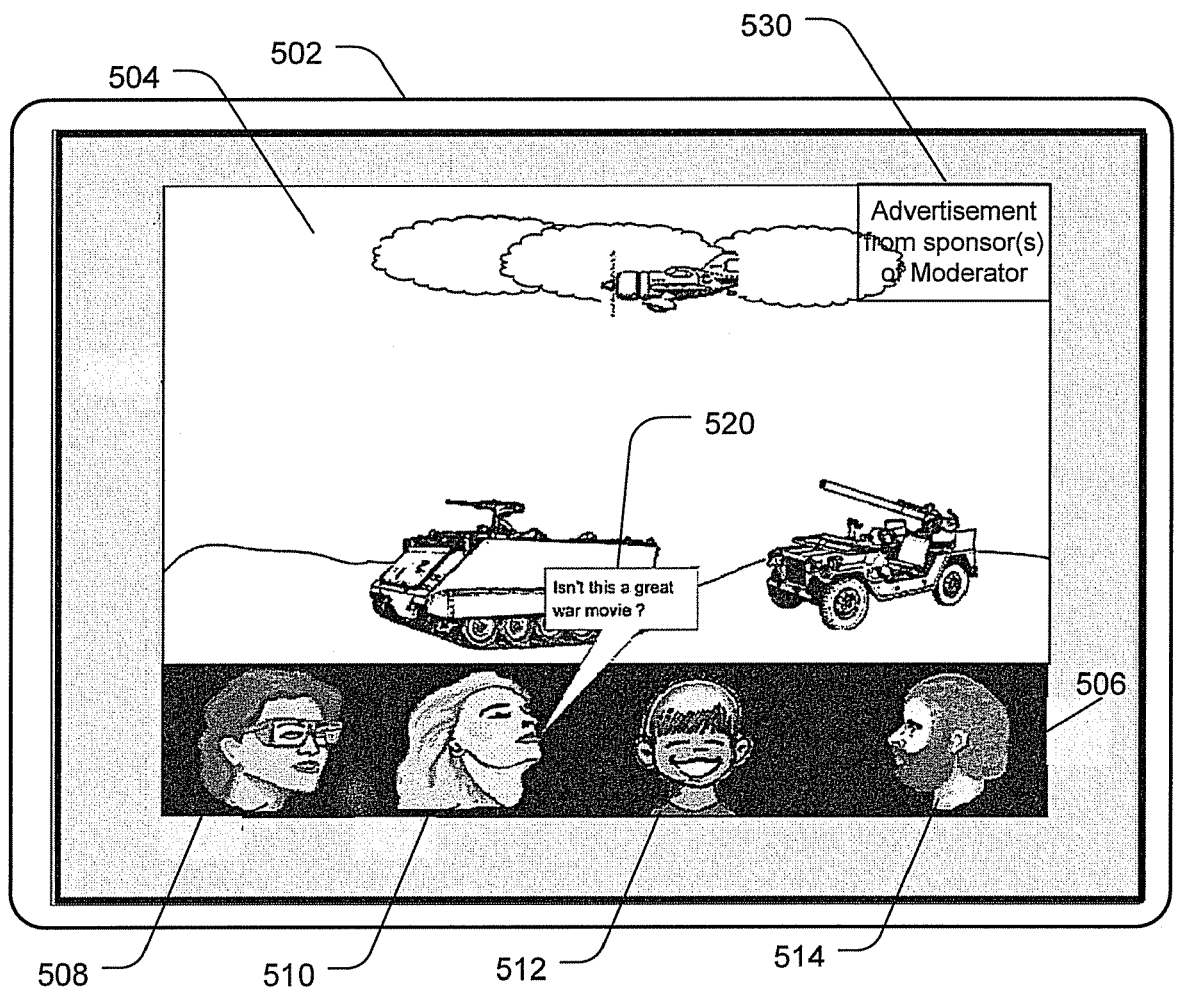
FIG. 5 depicts a general diagram of a particular illustrative embodiment of a session screen of a moderated collaborative session participant.

Referring to FIG. 5, a display device 502 is depicted having the content associated with a moderated collaborative session, such as an interactive media session provided via the system 100 of FIG. 1, or the system 200 of FIG. 2, in accordance with the methods depicted in FIGS. 3-4, or any combination thereof. Media content 504 is provided that is associated with a particular media stream. As illustrated, the media content 504 depicts a military movie. A "front row" 506 of users is graphically illustrated via user avatars 508, 510, 512, and 514 affiliated with users selected to be in the "front row" 506 of users via a moderator. An interactive comment 520 is displayed associated with a particular avatar 510. For example, the interactive comment 520 may include data that is provided by a remote user associated with the particular avatar 510. In a particular embodiment, the interactive comment 520 may correspond to text that is entered via a remote device of the remote user and received at an interactive media system, such as the interactive media system 134 of FIG. 1 or the interactive media system 234 of FIG. 2. An advertisement 530 from one or more sponsors of a moderator is also depicted. The advertisement 530 may be presented overlaid with the media content 504, in a display area not including the media content 504, upon selection of the moderator, or automatically inserted. In a particular embodiment, the advertisement 530 may be presented at the beginning of a group session. In other embodiments, the advertisement 530 may not be presented.

Figure 6:
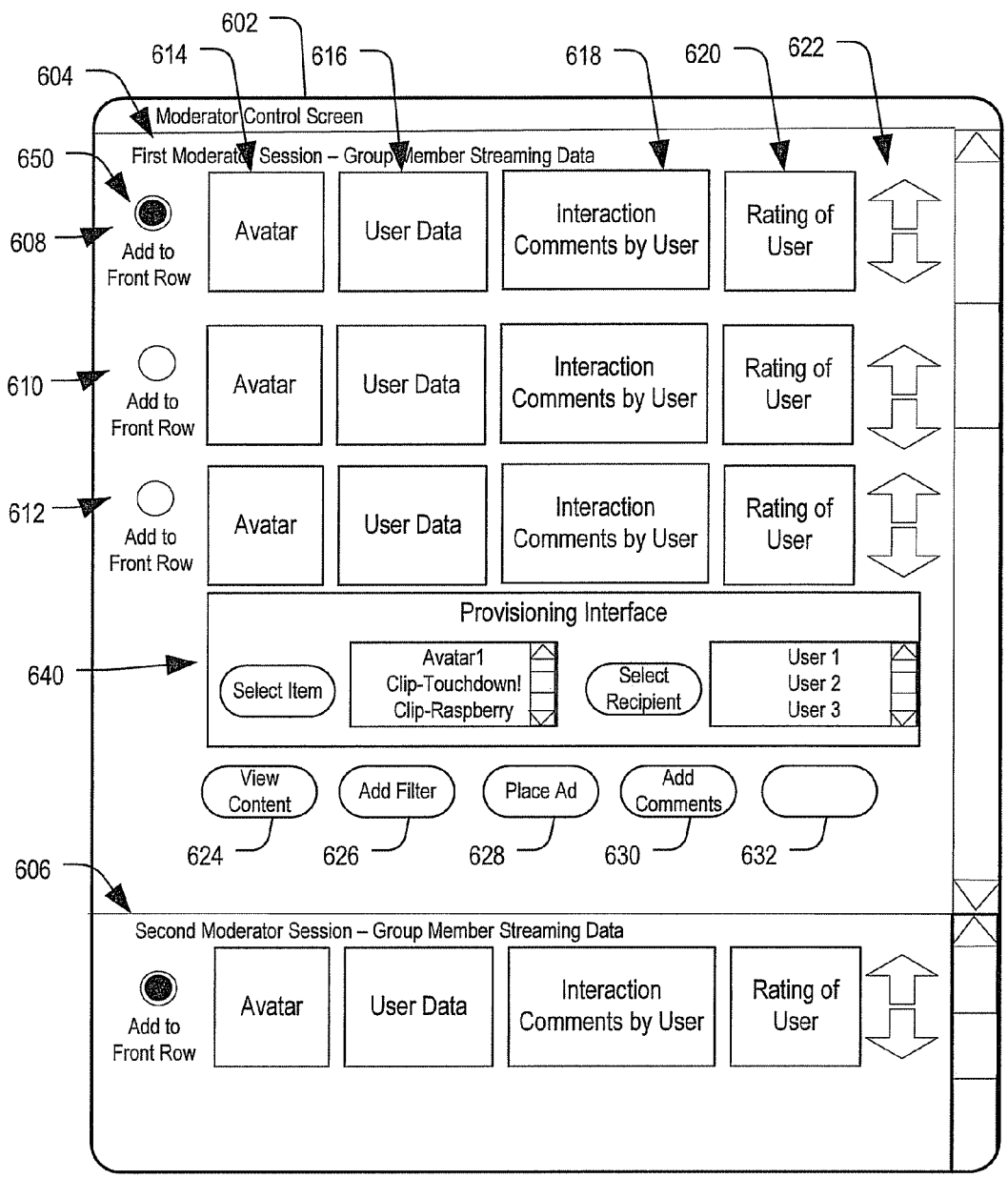
FIG. 6 depicts a general diagram a particular illustrative embodiment of a moderator control screen.

Referring to FIG. 6, a moderator control screen 602 is illustrated. For example, the moderator control screen 602 may be provided to the moderator display device 122 of FIG. 1 or to the moderator display device 222 of FIG. 2. The moderator control screen 602 includes a first display region 604 of a first moderator session and includes group member streaming data. The first display region 604 includes first data 608 associated with a first user, second data 610 associated with a second user, and third data 612 associated with a third user. Each of the first data 608, the second data 610 and the third data 612 includes an avatar 614, user data 616, interaction comments by the user 618, a rating of the user 620, and controls 622 to enable a moderator to adjust a rating of the user. In addition, a selectable element 650 enables the moderator to select or de-select each user to the "front row" of the users.

A provisioning interface 640 includes selectable controls to select a virtual item to distribute to one or more users of the first moderator session. For example, virtual items that may be distributed via the provisioning interface 640 may include avatars, pre-recorded multimedia clips, other content or virtual items, or any combination thereof. The first display region 604 of the first moderator session further includes a selectable view content control 624, an add filter control 626, a control to place an advertisement 628, a control to add comments 630, and other controls 632 to perform other moderation activities or controls.

The moderator control screen 602 includes a second display region 606 that may correspond to a second moderator session and may display group member streaming data of the second moderator session. The second moderator session may occur substantially concurrently overlapping with the first moderator session.

Figure 7:
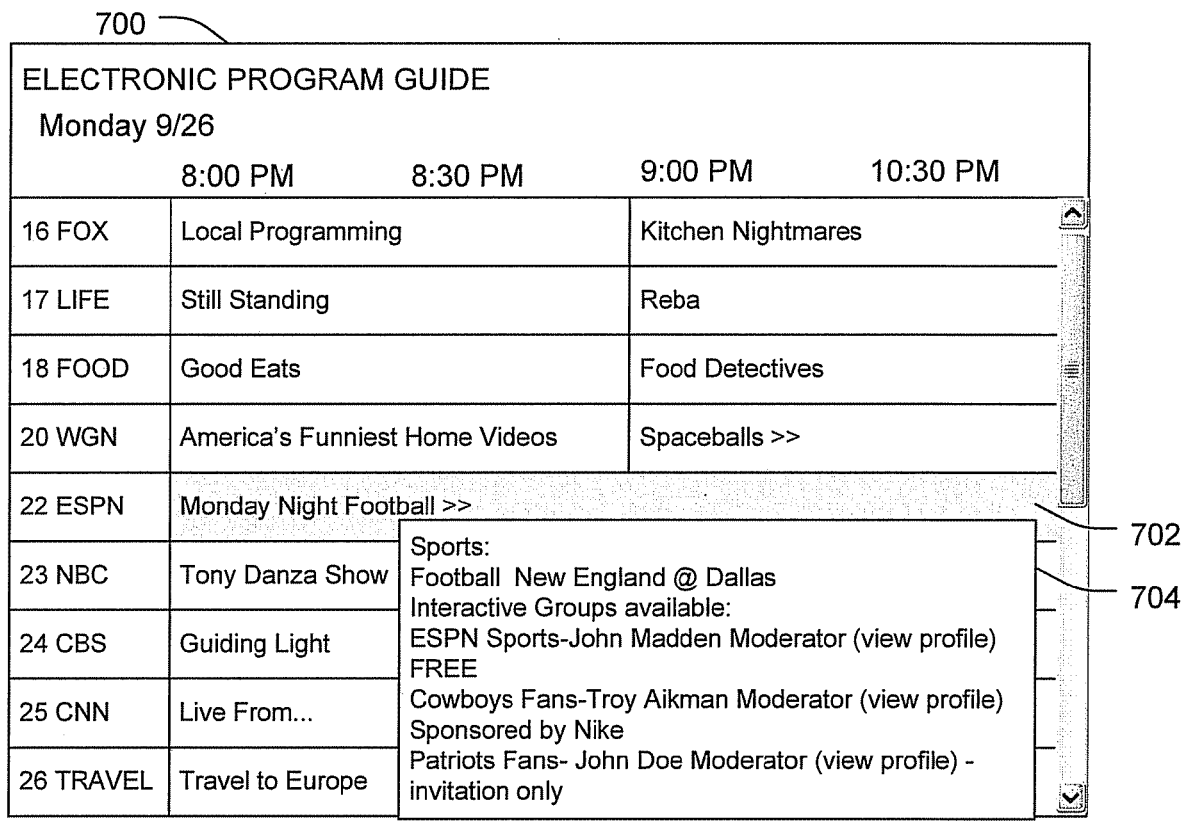
FIG. 7 depicts a general diagram a particular illustrative embodiment of an electronic program guide including moderated collaborative session information.

Referring to FIG. 7, an electronic program guide is depicted and generally designated 700. In a particular embodiment, the electronic program guide 700 may be provided via the EPG module 240 of FIG. 2. As illustrated, an entry 702 of the electronic program guide 700 may be selectable via a remote user of a moderated collaborative session or a remote user that is enabled to join one or more moderated collaborative sessions, and may be selectable to display information about the entry 702. For example, a display window 704 may be provided upon selection of the entry 702 to display data including a nature of a programmed event such as a television program, a description of the event, and a list of interactive groups available associated with the event. The list of interactive groups may include a sponsor, a name of a moderator, a user selectable profile that may be viewed, such as a link to view a profile, and a price to join the interactive group. Other information that may be provided in the display window 704 may include constraints such as invitation only groups, affiliations of the groups, such as fans of one team in a sporting event for one group and fans of another team of the sporting event for another group.

Figure 8:
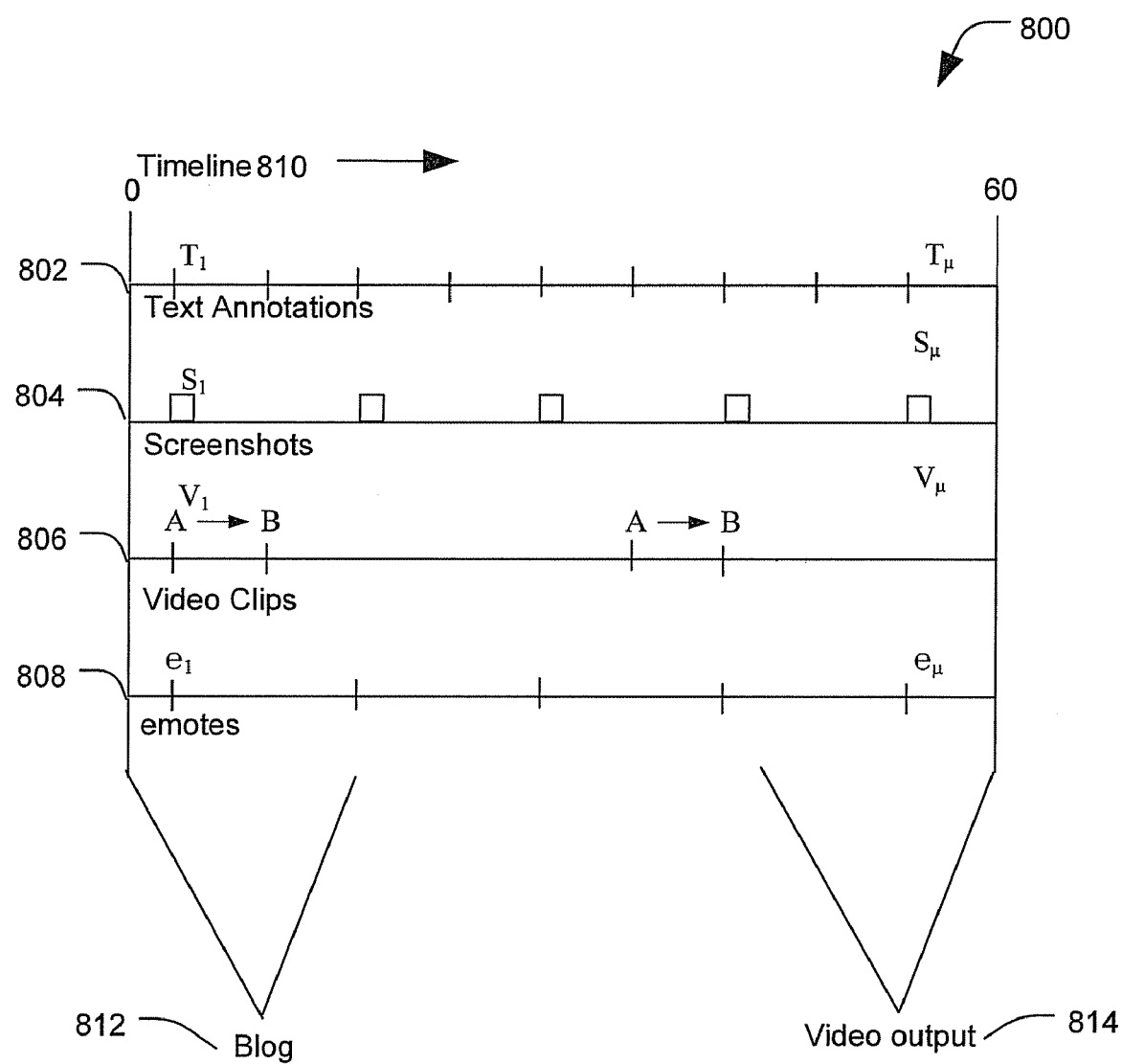
FIG. 8 depicts a general diagram of a particular illustrative embodiment of data associated with a moderated collaborative session.

Referring to FIG. 8, data associated with an interactive moderated collaborative session is depicted and generally designated 800. The data 800 may include metadata such as text annotations 802, screen shots 804, video clips 806, and emotes 808. Each of the metadata 802-808 may be stored and indexed according to a timeline 810. The timeline 810 may correspond to, and may be synchronized with, the media content that is associated with the moderated collaborative session. In a particular embodiment, the data 800 may represent a data structure enabling storage and retrieval of the interactive collaborative session in various forms. For example, portions of the data 800 may be output as entries of a website, such as a web log (blog) 812 website. As another example, the data 800 may be provided as a video output 814 such as a video program including media content, pop-up comments, icons indicating emotes, scrolling text in addition to the media content, or as a multi-media recording of events that may have been received at display devices of remote users of the interactive session. The data 800 may further be presented in other forms, such as via screen shots and clips to be stored and profiles such as the moderator profiles 250 of FIG. 2, in scrapbooks or electronic memento books of various users associated in the interactive sessions, as presentations or other display formats, or any combination thereof. The data 800 as depicted in FIG. 8 may indicate a standardized or exemplary format for recording, storing, importing, and exporting the interactive media session.

Figure 9:
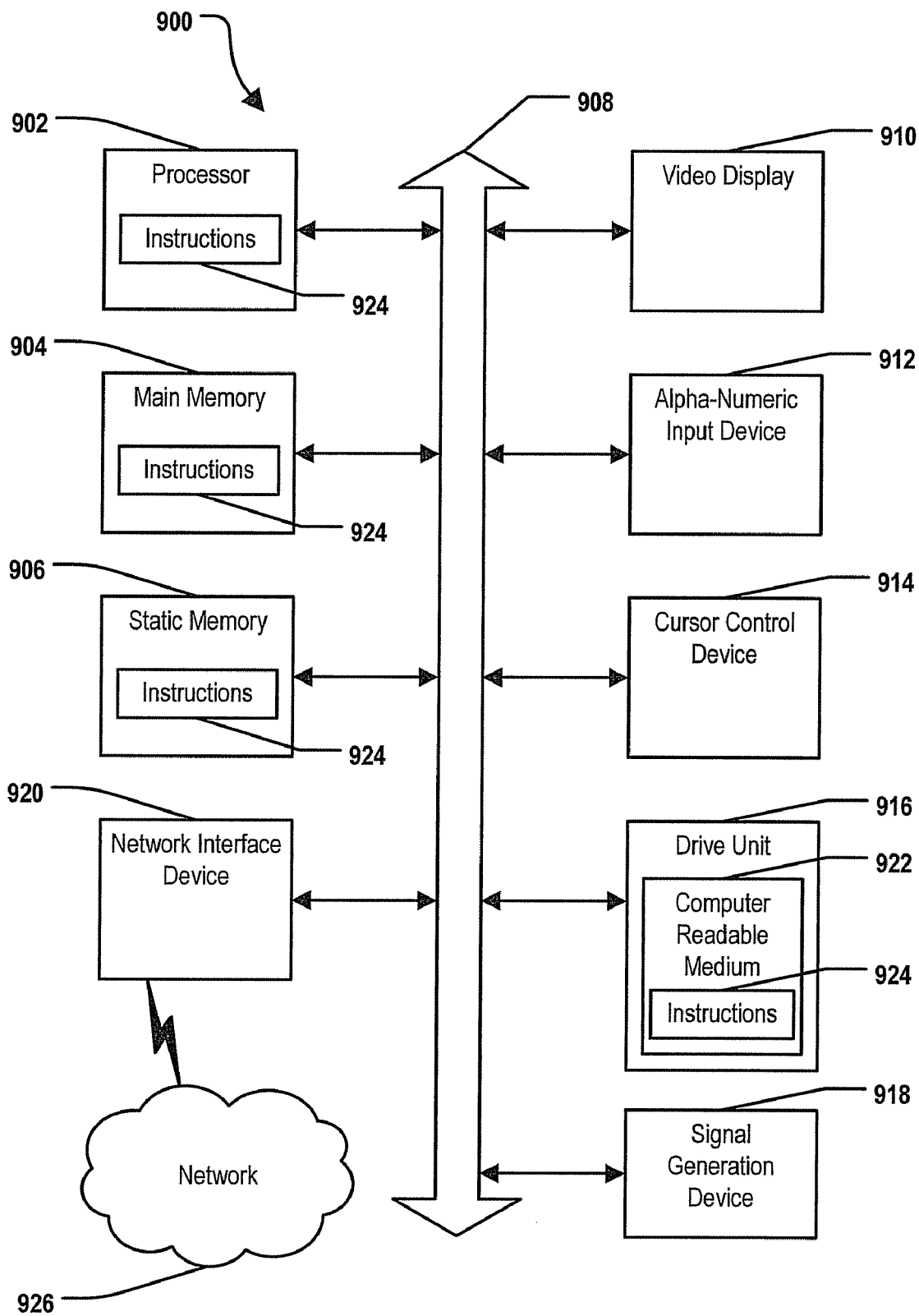
FIG. 9 depicts an illustrative general computing system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. For example, the computer system 900 may include or be included within any one or more of the servers, systems, engines, modules, communication networks, or display devices described herein.

In a networked deployment, the computer system may operate in the capacity of a server or as a client user computer in a server-client user network environment, or as a peer computer system in a peer-to-peer (or distributed) network environment. The computer system 900, or portions thereof, can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a control system, a camera, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video, and data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, that can communicate with each other via a bus 908. As shown, the computer system 900 may further include a video display unit 910, such as a liquid crystal display (LCD), a projection television display, a flat panel display, a plasma display, a solid state display, or a cathode ray tube (CRT). Additionally, the computer system 900 may include an input device 912, such as a remote control device having a wireless keypad, a keyboard, a microphone coupled to a speech recognition engine, a camera such as a video camera or still camera, or a cursor control device 914, such as a mouse device. The computer system 900 can also include a disk drive unit 916, a signal generation device 918, such as a speaker or a remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) as well as television standards (e.g., SDTV, NTSC, PAL, SECAM, HDTV, ATSC, DVB-T, ISDB-T), represent examples of the state of the art. Such standards are periodically superseded by faster or more efficient standards having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving a media stream from a content provider;
associating moderator controls with the media stream to create an interactive media session, wherein the interactive media session enables multiple users to interact with one another with respect to the media stream, wherein the moderator controls enable a moderator to define an automatic action to be performed in response to a specified condition that occurs within media content of the media stream received during the interactive media session, wherein the automatic action includes one of playing pre-recorded audio content and incorporating additional media content into the media stream, wherein the pre-recorded audio content and the additional media content are each determined based on a category associated with subject matter of the media content, and wherein the moderator controls enable the moderator to facilitate the interaction of the multiple users; and
sending display data to display devices of the multiple users, wherein the display data is based on moderator control input received via the moderator controls, interactive input received from the multiple users, and the received media stream;
wherein the automatic action includes triggering an action for user avatars associated with one or more of the multiple users;
wherein, when the subject matter of the media content is a sporting event, the specified condition is a score change detected within the media content and a game change flag is inserted into the media stream to indicate a game change, wherein the user avatars are configured to jump up and down in response to the game change flag being detected within the media content;
wherein, when the subject matter of the media content is one of a movie and a television program, the specified condition is one of a tone change and a mood change detected within the media content, wherein a mood flag is inserted into the media stream to indicate a mood change, and wherein the user avatars are configured to shake in response to the mood flag being detected within the media content.

2. The method of claim 1, wherein the moderator controls include an interface to select a front row of users from the multiple users, wherein interactive input received from the front row of users is included within the display data.

3. The method of claim 2, wherein interactive input received from a user of the multiple users that is not in the front row of users is not included in the display data.

4. The method of claim 3, further comprising sending the interactive input received from the user that is not in the front row of users to a moderator display device for display to the moderator.

5. The method of claim 2, wherein each of the multiple users is represented by at least one of the user avatars, and wherein the display data includes the user avatars associated with each user in the front row of users.

6. The method of claim 5, wherein the user avatars that are associated with users of the multiple users that are not in the front row of users are not included in the display data.

7. The method of claim 2, wherein the moderator controls include an interface to rate one or more users of the multiple users based on interactive input received from the one or more users during the interactive media session, wherein a rating determined by the moderator is used to select the front row of users.

8. The method of claim 1, wherein the moderator controls include a control to select an advertisement that is presented with the interactive media session, wherein the advertisement is associated with one or more sponsors of the moderator.

9. The method of claim 1, further comprising associating second moderator controls with a second interactive media session that is communicated concurrently with the first interactive media session, wherein the second moderator controls enable the moderator to facilitate interaction of second users, wherein the second display data further includes second moderator selectable elements associated with the second moderator controls.

10. The method of claim 1, wherein the moderator controls include a provisioning interface to enable distribution of one or more virtual items to one or more of the multiple users, wherein the one or more virtual items includes pre-recorded multimedia clips.

11. The method of claim 1, further comprising:
receiving an interactive input from at least one of the multiple users, and
storing the interactive input in a database with a timestamp indicating a time index of the media stream indicating when the interactive input was received.

12. A system comprising:
a content interface to receive a media stream including media content;
an interactive media system to receive interaction input from multiple users to interact with one another with respect to the media stream;
a moderator control system to provide moderator controls, wherein the moderator controls enable a moderator to define an automatic action to be performed in response to a specified condition that occurs within the media content of the media stream received during an interactive media session, wherein the automatic action includes inserting a flag into the media stream, wherein the flag is used to trigger actions of user avatars associated with one or more of the multiple users, wherein the moderator controls enable the moderator to facilitate interaction of the multiple users;

a display interface to send display data to a moderator display device, wherein the display data includes the media content and includes interaction input received from one or more of the multiple users and from a moderator control panel, wherein the moderator control panel includes selectable elements associated with the moderator controls; and a rating engine to receive ratings of the moderator from one or more of the multiple users, wherein the ratings identify specific ratings for the moderator including at least one of entertainment provided by the moderator, knowledge of the moderator, authority of the moderator, and appropriateness of the moderator.

13. The system of claim 12, wherein the display interface sends second display data to user devices of the multiple users, wherein the second display data includes the user avatars associated with one or more of the multiple users based on settings of the moderator controls.

14. The system of claim 12, further comprising a search engine to facilitate selection of the moderator, wherein the search engine accesses moderator profiles associated with one or more moderators and sends the moderator profiles to one or more of the multiple users.

15. The system of claim 14, wherein the moderator profiles include saved portions of interactive media sessions previously facilitated by a respective moderator.

16. The system of claim 15, wherein the moderator profiles further include user comments associated with the saved portions of the interactive media sessions and portions of media content associated with the saved portions of the interactive media sessions.

17. The system of claim 12, further comprising an electronic program guide module to provide an electronic programming guide that includes a list of available interactive groups that are available for an entry of the electronic programming guide that corresponds to a television program event, wherein the entry of the electronic programming guide includes a selectable option to view an available interactive group of the list of available interactive groups, wherein the electronic program guide module generates electronic program guide display data including one or more moderator profiles.

18. The system of claim 17, wherein the available interactive group of the list of available interactive groups includes a sponsor, a name of a moderator, a link to view one of the moderator profiles, and a price associated with accessing the available interactive group.

19. The system of claim 12, further comprising an availability module to provide presence information with respect to one or more users, wherein the presence information indicates whether the one or more users are available for interaction.

20. The system of claim 12, further comprising an availability module to provide availability information with respect to one or more moderators, wherein the availability information indicates whether the one or more moderators are available to moderate an interactive media session.

21. A non-transitory computer-readable medium comprising:

instructions that, when executed by a processor, cause the processor to perform a method comprising:

associating a set of moderator controls with a media stream, and to receive the media stream to create an interactive media session, wherein the set of moderator controls enables a moderator to define an automatic action to be performed in response to a specified condition that occurs within media content of the media stream received during the interactive media session, wherein the automatic action includes inserting a flag into the media stream, wherein the interactive media session enables multiple users to interact with one another with respect to the media stream and wherein the set of moderator controls enables the moderator to facilitate the interaction of the multiple users during display of the media steam;

sending display data to display devices of the multiple users, wherein the display data is based on moderator control input received via the set of moderator controls, based on interactive input received from the multiple users, and based on the received media stream; and sending moderator display data to the display devices of one or more of the multiple users, wherein the moderator display data indicates a fee charged by a particular moderator to moderate the interactive media session.

22. The non-transitory computer-readable medium of claim 21, wherein the moderator display data identifies moderators available to moderate the interactive media session.

23. The non-transitory computer-readable medium of claim 21, wherein the moderator display data indicates whether one or more users of the multiple users are authorized to participate in the interactive media session moderated by a particular moderator.

24. The non-transitory computer-readable medium of claim 21, wherein the method further comprises inviting one or more available users of the interactive media system to join the interactive media session, wherein the one or more available users have a user profile that indicates a preference for interactive media content associated with the interactive media session.

* * * * *